(12) United States Patent
Mohalik et al.

(10) Patent No.: US 12,190,153 B2
(45) Date of Patent: Jan. 7, 2025

(54) SYSTEM AND METHOD FOR EFFICIENT EXECUTION AND MONITORING OF MACHINE-TO-MACHINE DEVICE MANAGEMENT TASKS

(71) Applicant: Telefonaktiebolaget LM Ericsson (publ), Stockholm (SE)

(72) Inventors: Swarup Kumar Mohalik, Bangalore (IN); Senthamiz Selvi Arumugam, Solna (SE); Chakri Padala, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 845 days.

(21) Appl. No.: 17/267,861

(22) PCT Filed: Aug. 14, 2018

(86) PCT No.: PCT/IN2018/050528
§ 371 (c)(1),
(2) Date: Feb. 11, 2021

(87) PCT Pub. No.: WO2020/035870
PCT Pub. Date: Feb. 20, 2020

(65) Prior Publication Data
US 2021/0165690 A1 Jun. 3, 2021

(51) Int. Cl.
*G06F 9/50* (2006.01)
*G06F 9/54* (2006.01)
*H04L 67/125* (2022.01)

(52) U.S. Cl.
CPC ............ *G06F 9/5005* (2013.01); *G06F 9/542* (2013.01); *H04L 67/125* (2013.01)

(58) Field of Classification Search
None
See application file for complete search history.

(56) References Cited

U.S. PATENT DOCUMENTS 7,197,561 B1 3/2007 Lovy et al.
9,836,347 B2 12/2017 McChord et al.
(Continued)

FOREIGN PATENT DOCUMENTS

CN 102541539 A 7/2012
CN 103631691 A 3/2014
(Continued)

OTHER PUBLICATIONS

Steinheirmer, M., "Autonomous decentralised M2M Application Service Provision", University of Plymouth Research Theses, Dec. 2017, pp. 1-545, https://pearl.plymouth.ac.uk/, University of Plymouth.
(Continued)

*Primary Examiner* — Eric C Wai
(74) *Attorney, Agent, or Firm* — COATS & BENNETT, PLLC

(57) ABSTRACT

In a M2M device management system, a Task Orchestration Module, TOM (32) external to the M2M device (20) manages the execution of tasks wholly or partly on the M2M device (20). This alleviates the M2M device (20) of the need to store code, execute tasks, monitor task execution, and the like. The tasks are specified using Finite State Machine, FSM, syntax. A task URL, tURL (34) resource on the M2M device (20) provides a tURL (34) to a resource hosting (36) a service (38) mapping task-IDs to FSM specifications. Communications between the TOM (32) and M2M device (20) is compactly and efficiently achieved using a device management protocol server/client system (16, 18), such as LightWeightM2M (LWM2M). A predetermined mapping (40) at the M2M device (20) maps action labels to library functions (22) of the M2M device (20), obviating the need for code in the M2M device (20) to interpret and execute actions. An event trigger decision module (42) at the TOM (32) interprets events and conditions reported by the device management protocol client (18), and determines when state transition events have occurred.

24 Claims, 12 Drawing Sheets

(56) References Cited

U.S. PATENT DOCUMENTS

| | | |
|---|---|---|
| 10,437,635 B2 | 10/2019 | Layman et al. |
| 2015/0286820 A1 | 10/2015 | Sridhara et al. |
| 2015/0382132 A1 | 12/2015 | Wu et al. |
| 2016/0062804 A1 | 3/2016 | Stanfill et al. |
| 2017/0228253 A1* | 8/2017 | Layman ............. G06F 11/3013 |
| 2017/0285981 A1 | 10/2017 | DeArment |

FOREIGN PATENT DOCUMENTS

| | | | |
|---|---|---|---|
| CN | 103716822 | A | 4/2014 |
| CN | 108259267 | A | 7/2018 |
| EP | 1213892 | A | 6/2002 |
| JP | 2017142798 | A | 8/2017 |
| WO | 2017045727 | A1 | 3/2017 |

OTHER PUBLICATIONS

Wang, F., et al., "Application of FSM in task management of open CNC system", Mechanical Design and Manufacturing, No. 5, May 2011, pp. 245-247, China Academic Journal Electronic Publishing House, 2DOI:10.19356/j.cnki.1001-3997.2011.05.094.

China IPO Search Report for CN Application No. 2018800965896 filed Aug. 14, 2018, Mailed Jul. 9, 2023, p. 3—Machine English Translation.

Open Mobile Alliance, "Lightweight Machine to Machine Technical Specification", Approved Version 1.0, Feb. 8, 2017, pp. 1-138, OMA.

\* cited by examiner

Object definition

| Name | Object ID | Instances | Mandatory | Object URN |
|---|---|---|---|---|
| Device | 3 | Single | Mandatory | urn:oma:lwm2m:oma:3 |

Resource definitions

| ID | Name | Operations | Instances | Mandatory | Type | Range or Enumeration | Units | Description |
|---|---|---|---|---|---|---|---|---|
| 0 | Manufacturer | R | Single | Optional | String | | | Human readable manufacturer name |
| 1 | Model Number | R | Single | Optional | String | | | A model identifier (manufacturer specified string) |
| 2 | Serial Number | R | Single | Optional | String | | | Serial number |
| ... | | | | | | | | |
| N | Task URL | R | Single | Optional | String | | | URL to the resource hosting the task definition service |

Figure 4

```
FSM = {"task-name    :<task-name>,
        "init"        : "idle",
        "downloading"
                    {"action"       : "download",
                      "transition"  :
                                    [{"event"        "interrupt",
                                      "condition"   "res == 4",
                                      "next-state": "idle"},
                                    :
                                    ]
                    }
                    :
        }
```

SYSTEM AND METHOD FOR EFFICIENT EXECUTION AND MONITORING OF MACHINE-TO-MACHINE DEVICE MANAGEMENT TASKS

TECHNICAL FIELD

The present invention relates generally to wireless communication networks, in particular to an apparatus and method of managing the execution of tasks using Machine-2-Machine devices operative in the network.

BACKGROUND

Wireless communication networks continue to grow in deployment, scope, number of subscribers, capacity, and technical sophistication, including increased data rates, higher bandwidth, reduced latency, support for greater numbers of users, and the like. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

One focus of 5G wireless communication network development is for machine type communication (MTC). Unlike mobile broadband services supporting, e.g., sophisticated smartphones with ever-higher bandwidth, data rates, and the like, MTC provides advanced capabilities in the opposite direction: limited-bandwidth, low-data-rate service to simple, cheap devices with very low power budgets. MTC devices are also known as Machine-2-Machine (M2M) devices, as they are characterized by autonomous communications without human interaction. Indeed, vast numbers of M2M devices are envisioned that lack any user interface. Representative applications include automated utility meter reading, sensors and actuators in autonomous vehicles, supply chain automation, industrial instrumentation, remote health sensing, fleet management, and the like.

In Release 13, the Third Generation Partnership Project (3GPP) standardized two different approaches to M2M communications. Enhanced MTC (eMTC), also known as Long Term Evolution-Machine-to-machine (LTE-M), includes cost reduction measures such as lower bandwidth, lower data rates, and reduced transmit power, as compared to legacy (broadband) LTE. Narrowband Internet of Things (NB IoT) more aggressively addresses the extremely low cost market with less than 200 KHz of spectrum and flexibility to deploy concurrently with legacy networks or outside of active legacy spectrum. NB-IoT targets improved indoor coverage, support for massive numbers of low throughput devices, low delay sensitivity, ultra-low device cost, and low device power consumption (i.e., years-long battery life).

Management and control of deployed M2M devices present numerous challenges. The devices perform numerous types of tasks, which are usually implemented by the manufacturers, either proprietary or based on some standards. These tasks are implemented using basic software libraries interfacing with the hardware (exposed as an Application Programing Interface, or API) and the glue logic to orchestrate the libraries.

Apart from the need for proper sequencing, a variety of monitoring and error-handling sub-tasks make the logic implementation complex. Since the code is in the devices, it takes up sparse on-board memory space, and execution of the code, which includes monitoring the progress of the tasks, consumes battery power. Furthermore, any update in the code requires accessing the device, reflashing, and testing, all of which add to downtime and may impact Service Level Agreements (SLA).

M2M interoperability standards have been developed, and compliance is being mandated in many cases, in order to gain interoperability with applications from external vendors. For example, Light-Weight M2M (LWM2M) is a protocol from the Open Mobile Alliance (OMA) for M2M or IoT device management. LWM2M is built on the Constrained Application Protocol (CoAP), and it defines the application layer communication protocol between a LWM2M server and a LWM2M client. The LWM2M server may be implemented on a server computer or in a distributed computing environment such as the so-called "cloud" or, more likely, at an interface between the cloud and a set of deployed M2M devices, known as the cloud "edge." The LWM2M client is typically implemented in the M2M device.

According to the LWM2M protocol, each object includes resources which may be queried or manipulated. For example, as defined in the LWM2M Standard (V1_0-20170208-A § E.4, p. 108), a standard device object has an Object ID of 3; read-only resources such as Manufacturer, Model Number, Serial Number, Power Source Voltage/Current, Battery Level; read-write resources such as Current Time, UTC Offset, Timezone; and executable resources such as Reboot, Factory Reset, Reset Error Code. The system is extensible, allowing users to create objects with particular functionality; these objects can be registered with OMA, and promulgated for general use.

Leshan is a set of open-source libraries, promulgated by the Eclipse Foundation, that facilitate the implementation of LWM2M servers and clients. Leshan provides a standardized, compact, object-oriented way to implement common M2M device management operations. Leshan is only representative of possible M2M server/client implementations; the more general term "device management protocol server/client" is used herein.

Microsoft Azure and Amazon Web Services (AWS) are cloud- or edge-based M2M device management platforms. However, these platforms assume knowledge of the procedures or library modules on the M2M device. Device manufacturers can implement task management over different platforms, but maintenance of custom platforms becomes costly.

FIG. 1 depicts a typical M2M device management deployment 10 using the device management protocol server/client approach. A task management application 12 controls the overall management of task execution. The task management application 12 communicates with an M2M platform 14, which may reside in the cloud or at a cloud edge. In some embodiments, the M2M platform 14 may comprise an Azure or AWS implementation. The M2M platform 14 executes a device management protocol server 16, such as a Leshan server. The device management protocol server 16 communicates with a corresponding device management protocol client 18, executing on an M2M device 20, such as an NB-IoT compliant device. The M2M device 20 typically ships with a set of library functions 22, which may be accessed via an API. Task specific code 24, residing and executing on the M2M device 20, controls not only the execution of actions comprising a particular task, but also monitors the conditions and events that control the sequencing of those actions and the progression and completion (or failure, and subsequent error-handling) of the task.

As discussed above, this task specific code 24 consumes memory space, computational resources, and power on the M2M device 20. Furthermore, the M2M platform 14 must be aware of the task specific code 24, as well as any library functions 22 that are not standardized as objects in the device management protocol.

Reference designs for implementing task logic to perform many common tasks have been developed and standardized. Each task may be defined as a Finite State Machine (FSM). For example, FIG. 2 depicts the FSM for a Firmware Update, as defined in the LWM2M Specification (V1_0-20170208-A, p. 117). In the FSM diagram, states are represented as rounded rectangles, and transitions between states are drawn as arrows. The labels on state transition arrows have the syntax of trigger [guard]/behavior, where trigger is an event that may cause a state transition, guard is a condition, and behavior is an activity that executes while the transition takes place. States may also include assertions and variable assignments. For example, the IDLE state asserts that the variable "Update Result" (abbreviated "Res") must be between 0 and 9. The IDLE state also sets the State variable to 0.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, a Task Orchestration Module (TOM) external to a M2M device manages the execution of tasks wholly or partly on the M2M device. This alleviates the M2M device of the need to store code, execute tasks, monitor task execution, and the like. The tasks are specified using Finite State Machine (FSM) syntax, which defines a plurality of states, actions performed within each state or during state transitions, and the events and conditions (indicated by state variables) that specify transitions between the states. A task URL (tURL) resource on the M2M device provides a tURL identifying a resource that hosts a service mapping task-IDs to FSM specifications. Communications between the TOM and M2M device—including configuration, action execution commands, and monitoring of events and conditions—is compactly and efficiently achieved using a device management protocol server/client system, such as Light-Weight M2M (LWM2M, e.g., Leshan server/clients available for that protocol). A predetermined mapping at the M2M device maps action labels to library functions of the M2M device, obviating the need for code in the M2M device (or the device management protocol client) to interpret requested actions—rather, the actions are mapped to existing M2M device library functions. An event trigger decision module at the TOM interprets events and conditions reported by the device management protocol client, and determines when state transition events have occurred.

One embodiment relates to a method, performed by a Task Orchestration Module (TOM), of executing a task at least partially on a machine-to-machine (M2M) device. A task-ID, identifying a task to be executed, is obtained. A finite state machine (FSM) specification associated with the task is retrieved from a service hosted at a task uniform resource locator (tURL), based on the task-ID. Successively for each of a plurality of states in the FSM, one or more actions associated with the state, and events and conditions for all transitions out of the state, are ascertained; it is determined that at least one action can be performed by the M2M device; a device management protocol client is configured to observe and report the events and conditions; the device management protocol client is commanded to execute, on the M2M device, the action associated with the state; the device management protocol client is monitored for occurrence of configured events or conditions; it is decided when an event is triggered; and the current state is transitioned out of, in response to the FSM specification and the event trigger.

Another embodiment relates to a node of a wireless communication network implementing a Task Orchestration Module (TOM). The node is operative to execute a task at least partially on a machine-to-machine (M2M) device. The node includes a transceiver and processing circuitry operatively connected to the transceiver. The processing circuitry is configured to: obtain a task-ID identifying a task to be executed; and retrieve, from a service hosted at a task uniform resource locator (tURL), a finite state machine (FSM) specification associated with the task, based on the task-ID. Successively for each of a plurality of states in the FSM, the processing circuitry is operative to: ascertain one or more actions associated with the state, and events and conditions for all transitions out of the state; determine that at least one action can be performed by the M2M device; configure a device management protocol client to observe and report the events and conditions; command the device management protocol client to execute, on the M2M device, the action associated with the state; monitor the device management protocol client for occurrence of configured events or conditions; decide when an event is triggered; and transition out of the current state in response to the FSM specification and the event trigger.

Yet another embodiment relates to a computer readable medium containing instructions that, when executed by processing circuitry on a node operative in a wireless communication network, are operate to cause the node to implement a Task Orchestration Module, TOM operative to execute a task at least partially on a machine-to-machine, M2M, device. In executing the task, a task-ID, identifying a task to be executed, is obtained. A finite state machine (FSM) specification associated with the task is retrieved from a service hosted at a task uniform resource locator (tURL), based on the task-ID. Successively for each of a plurality of states in the FSM, one or more actions associated with the state, and events and conditions for all transitions out of the state, are ascertained; it is determined that at least one action can be performed by the M2M device; a device management protocol client is configured to observe and report the events and conditions; the device management protocol client is commanded to execute, on the M2M device, the action associated with the state; the device management protocol client is monitored for occurrence of configured events or conditions; it is decided when an event is triggered; and the current state is transitioned out of, in response to the FSM specification and the event trigger.

Still another embodiment relates to a method, performed by a device management protocol client executing on a machine-to-machine (M2M) device, of executing at least parts of tasks on the M2M device by a remote Task Orchestration Module (TOM). Configuration information regarding events and conditions to observe and report to the TOM is received from the TOM. A command to execute an action on the M2M device is received from the TOM. The commanded action is mapped, via a predetermined mapping stored on the M2M device, to calls to an application programming interface (API) of the M2M device. The calls to the API are executed on the M2M device. Events and associated state variables are reported to the TOM in conformance with the configuration information.

Still another embodiment relates to a machine-to-machine (M2M) device operative in a wireless communication network and to execute at least parts of tasks under the control of a remote Task Orchestration Module (TOM). The device includes a transceiver and processing circuitry operatively connected to the transceiver. The processing circuitry implements a device management protocol client configured to: receive, from the TOM, configuration information regarding events and conditions to observe and report to the TOM; receive, from the TOM, a command to execute an action on the M2M device; map, via a predetermined mapping stored on the M2M device, the commanded action to calls to an application programming interface (API) of the M2M device; execute the calls to the API on the M2M device; and report events and associated state variables to the TOM in conformance with the configuration information.

Still another embodiment relates to a computer readable medium containing instructions that, when executed by processing circuitry on a machine-to-machine, M2M, device operative in a wireless communication network, are operate to cause the M2M, device to execute at least parts of tasks on the M2M device by a remote Task Orchestration Module, TOM. In executing at least parts of these tasks, configuration information regarding events and conditions to observe and report to the TOM is received from the TOM. A command to execute an action on the M2M device is received from the TOM. The commanded action is mapped, via a predetermined mapping stored on the M2M device, to calls to an application programming interface (API) of the M2M device. The calls to the API are executed on the M2M device. Events and associated state variables are reported to the TOM in conformance with the configuration information

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art Like numbers refer to like elements throughout.

FIG. 4 is a table showing an extension to the resource definitions of an object to add a task URL resource.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Embodiments of the present invention relate to a task-oriented M2M device management model wherein task management and control is performed by a network entity other than the M2M device. As used herein, a task is one or more actions, which are performed in response to conditions and events, in a predetermined manner to accomplish a specific function. Examples of tasks include firmware update, bootstrapping, rebooting, location update, status check, and the like. Locating the task management activity external to the M2M device achieves significant advantages, including reducing the code storage, computational, and power requirements of the M2M device. Furthermore, while tasks execution will typically be directed to, or require the interaction of, one or more M2M devices, tasks may additionally include actions such as intermediary calculations, obtaining timestamps, unit conversion, and the like, which may be executed using computational resources other than the M2M device, further conserving M2M device resources.

Figure 1:
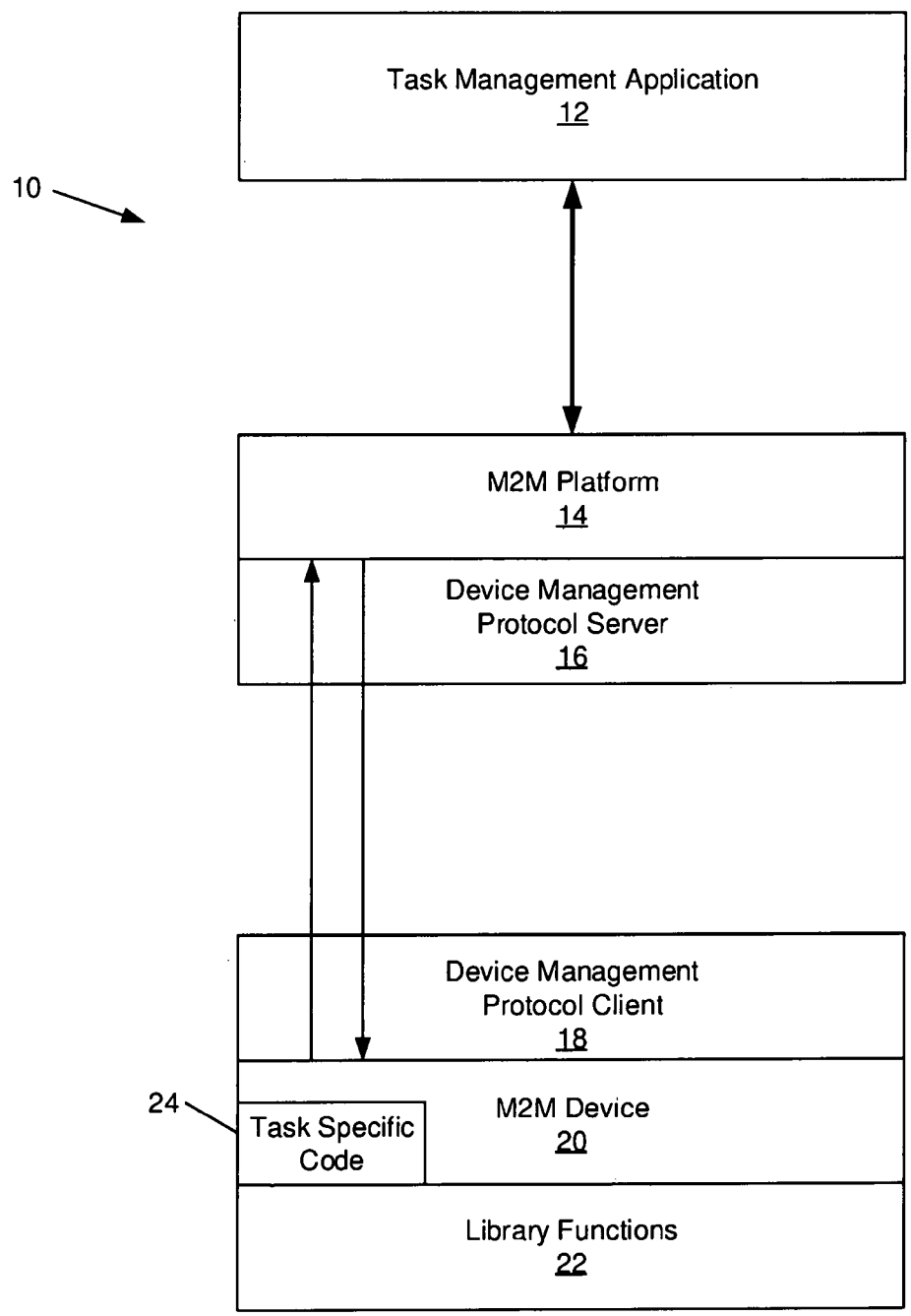
FIG. 1 is a block diagram of a prior art approach to M2M device management.
Figure 2:
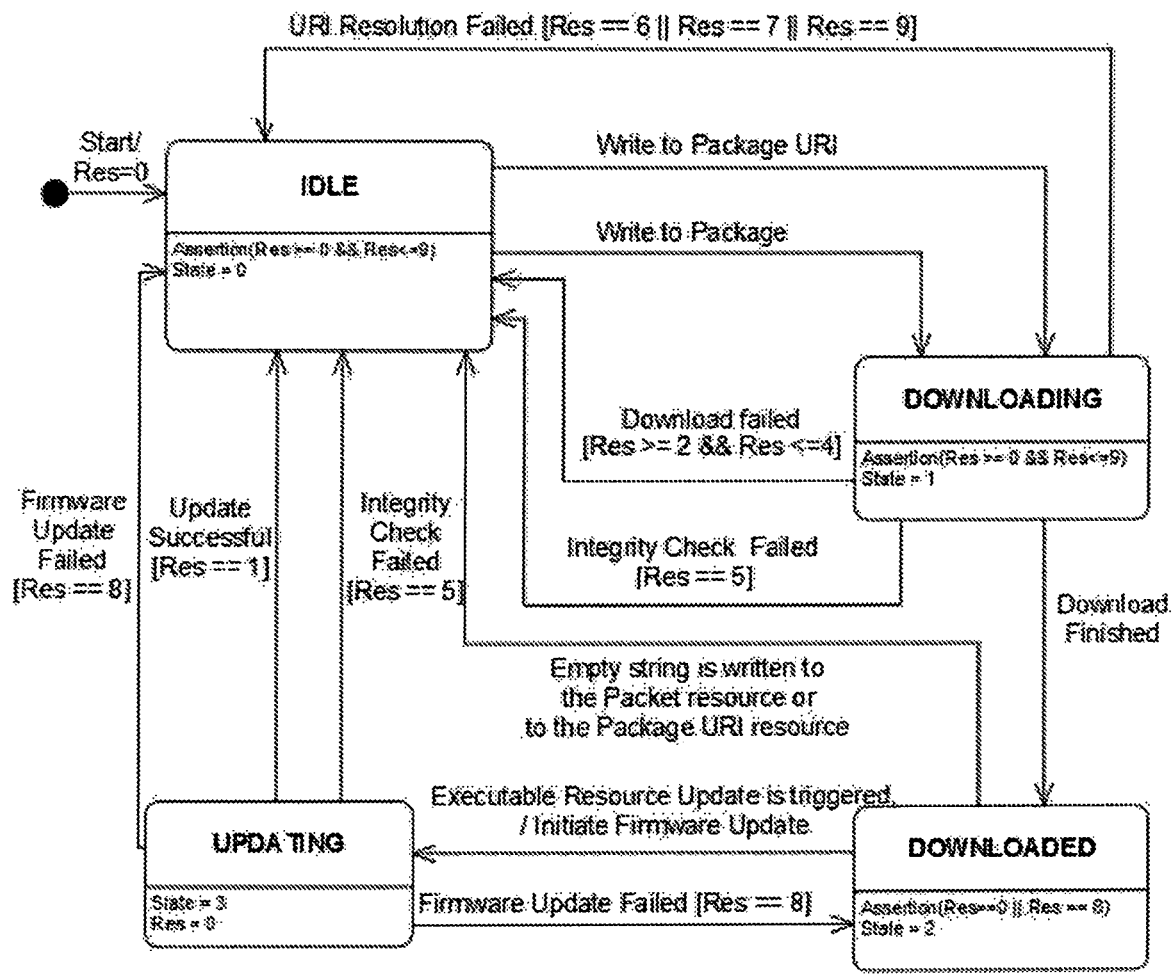
FIG. 2 is a state diagram of a known Finite State Machine implementing a Firmware Update task.
Figure 3:
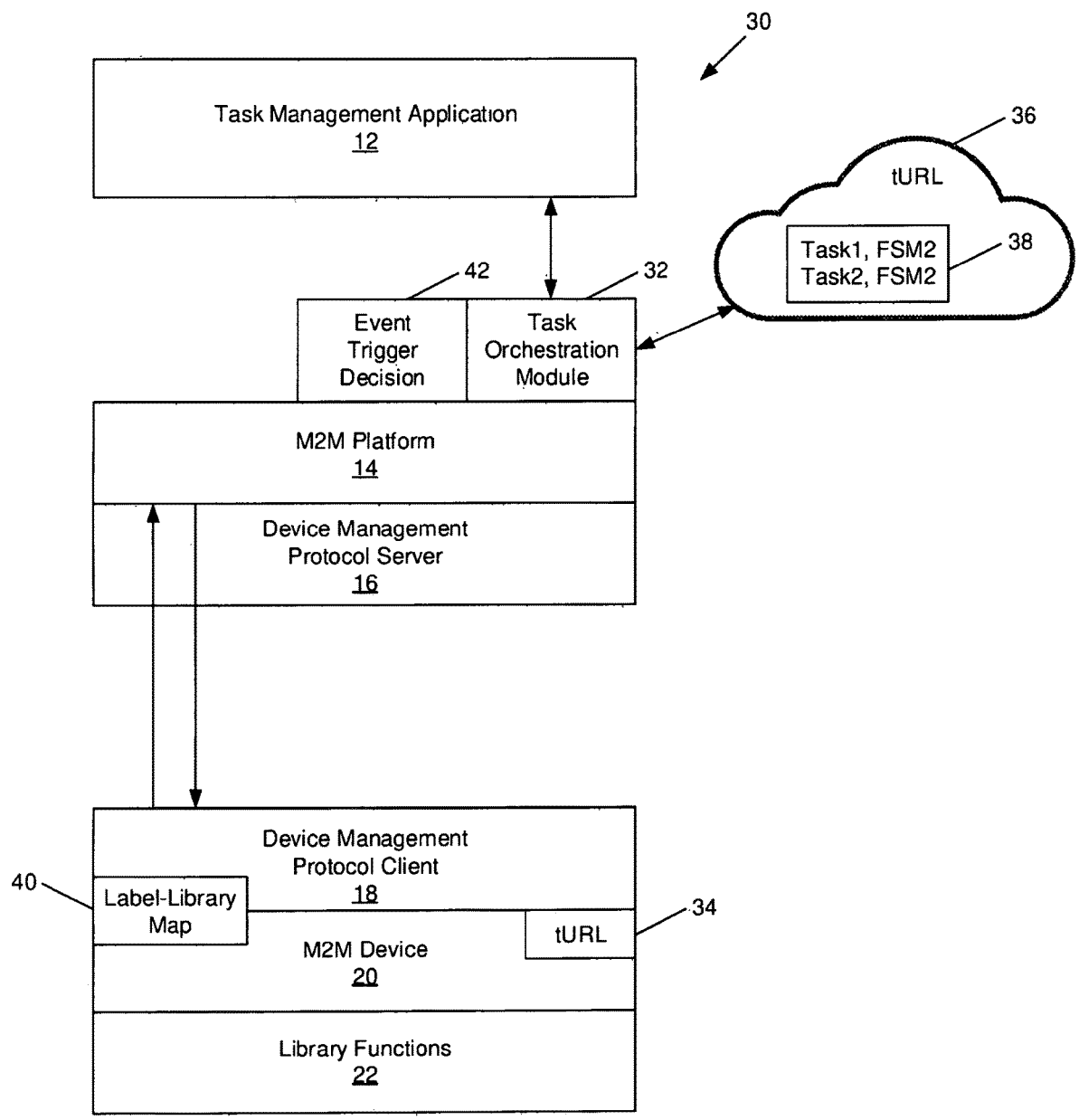
FIG. 3 is a block diagram of M2M device management according to embodiments of the present invention.

FIG. 3 depicts a block diagram of a M2M device management system 30, according to embodiments of the present invention. A Task Orchestration Module (TOM) 32 is depicted as executing on a wireless network node having a wireless link to a M2M device 20. In other embodiments, the TOM 32 may execute in the cloud or at an edge. The TOM 32 organizes and manages the execution of tasks, some actions of which are executed by one or more M2M devices 20.

The TOM 32 accesses a task Uniform Resource Locator (tURL) resource 34 on an M2M device 20 to discover the host 36 of a task definition service 38 that defines tasks in terms of Finite State Machine (FSM) specifications. In general, the tURL 34 may resolve to any accessible network location hosting the task definition service 38, such as a dedicated server in a proprietary network, a public server on the internet, a service in the cloud, or the like. In some embodiments, the TOM 32 reads the tURL resource 34 from all M2M devices 20 it may manage in advance, such as upon the devices' power-on and registration. In one embodiment, the tURL resource 34 is defined as a resource of the device object corresponding to the M2M device 20 in the device management protocol server/client syntax. FIG. 4 depicts a partial listing of the standard LWM2M device object, depicting one possible extension to add a tURL resource 34 (See LWM2M Standard V1_0-20170208-A § E.4, p. 108).

Figure 5:
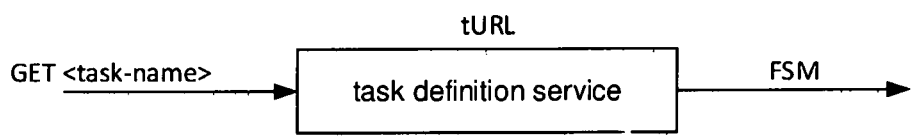
FIG. 5 is an example of a JSON object returning a requested FSM specification.

The TOM 32 receives a task-ID from a task management application 12, identifying a task to be performed. If not previously obtained, the TOM 32 reads the tURL 34 from one or more M2M devices 20. Having obtained the tURL 34 from the M2M device 20, the TOM 32 accesses the task definition service 38 at the host 36 identified by the tURL 34. The TOM 32 indexes the task definition service 38 using the task-ID received from the task management application 12, to obtain a FSM defining the requested task. The FSM defines the task in terms of states and state transitions, actions performed within states or during transitions, and conditions and events triggering state transitions and the task completion. Events are either external events or the end of the execution of an action. Conditions are based on state variables exposed by the M2M device 20. In one embodiment, the task definition service 38 is accessed through Representational State Transfer (REST) APIs. The FSM may be returned through a JavaScript Object Notation (JSON) object, as depicted in FIG. 5. The TOM 32 may optionally perform various tests on the FSM, such as a syntax check, to verify that the FSM specification is proper. The TOM 32 may also perform various other preliminary checks, such as verifying that it has access to the M2M device(s) 20 necessary to complete the task, that it has requisite permissions, and the like. Such preliminary procedures are readily understood by those of skill in the art, and not elaborated further herein.

The TOM 32 then successively steps through each state in the FSM, according to the FSM state transition definitions. At each state, the TOM 32 ascertains one or more actions associated with the state, and events and conditions for all transitions out of the state. When a device is in a particular state and an action associated with the state is being executed, the state transition depends upon:

a condition which is satisfied because of changing values of certain variables;

an event such as "the completion of download;" "arrival of a special signal, e.g. interrupt;" or the like; or a special event of "timeout" which indicates the current action should be interrupted and the FSM should transition to a predetermined states after a timeout of T.

In one embodiment, the TOM 32 determines which actions should be performed by which available computing resources, and dispatches the actions to the appropriate resources. As relevant here, the TOM 32 determines that at least one action can be performed by the M2M device 20.

In each state, the TOM 32 configures the device management protocol client 18 to observe and report the events and conditions relevant to the state and the action(s). In device management protocols such as LWM2M, an observe-notification configuration can be set for a particular sensor using certain parameters. Pmin is a minimum "wait" time—the interval between two consecutive observations cannot be less than Pmin. This is used to prevent excessive observations. Pmax is a maximum "delay" time—the interval between two consecutive observations should not be more than Pmax. This is used to prevent excessive delay in accessing the sensor values. If the FSM state defines a timeout specifying a time T, then the TOM 32 starts a clock object, and sets Pmin=Pmax=T. This will result in a notification exactly at time T (the definition of a timeout). If there is an event and state variables defining the event, then for each state variable, the TOM 32 takes one of two configuration options:

1. set Pmin=0, Pmax=T; in this case, any change in the state variable will be notified as the trigger for the event, and the TOM 32 then evaluates the event definition; or
2. set a virtual object and resource R in the device management protocol client 18 with the event definitions, and set Pmin=0, Pmax=T for this resource R, so that only the final trigger, if any, is notified to the TOM 32.

Whenever an event is triggered, the state variables for the conditions are also notified by the device management protocol client 18 to the TOM 32.

Having configured the device management protocol client 18 for the current state, the TOM 32 then commands the device management protocol client 18 to execute an action associated with the current state on the M2M device 20. To achieve this, in one embodiment, the TOM 32 sends the action label (e.g., ReadMeter, ReportGPSLocation) to the device management protocol client 18. The device management protocol client 18 accesses a predetermined mapping, such as the label-library map 40, to map the action label to the actual library functions 22 (e.g., API calls) on the M2M device 20 which implement the action. The library functions 22 are registered with the device management protocol client 18, which performs the functions 22 and returns the results to the device management protocol server 16 in accordance with the device management protocol server/client syntax. In this manner, neither the device management protocol client, nor explicit code on the M2M device 20, need be aware of the meanings of requested actions. The action labels are simply mapped to library functions 22 (of which the device management protocol client 18 is aware) for execution.

The device management protocol client 18 reports events and conditions according to its configuration by the TOM 32. An event trigger decision module 42 associated with the TOM 32 monitors the events and conditions reported by the device management protocol client 18, and determines when an event is triggered. There is a trade-off between the two state variable options outlined above. If the number of variables in the event conditions is small, and there is a good probability of event-trigger with the change in the state variables, the TOM 32 adopts option 1 (Pmin=0, Pmax=T). Alternatively, if the number of variables in the event conditions is large, or there is a poor probability of event-trigger with the change in the state variables, the TOM 32 adopts option 2 (Pmin=0, Pmax=T for resource R). In one embodiment, this decision is enabled by a machine language (ML) module that employs supervisory learning on the history of the variable values and event-triggers. This is done only for a predetermined training period, and repeated only when the event definitions and state variable access methods are re-implemented on the M2M device 20. In response to the event triggers, and in accordance with the FSM specification, the TOM 32 then transitions out of the current state. If the FSM directs it to a new state, the TOM 32 repeats the process, beginning with ascertaining the actions associated with the new state, and events and conditions for all transitions out of the new state.

Figure 6:
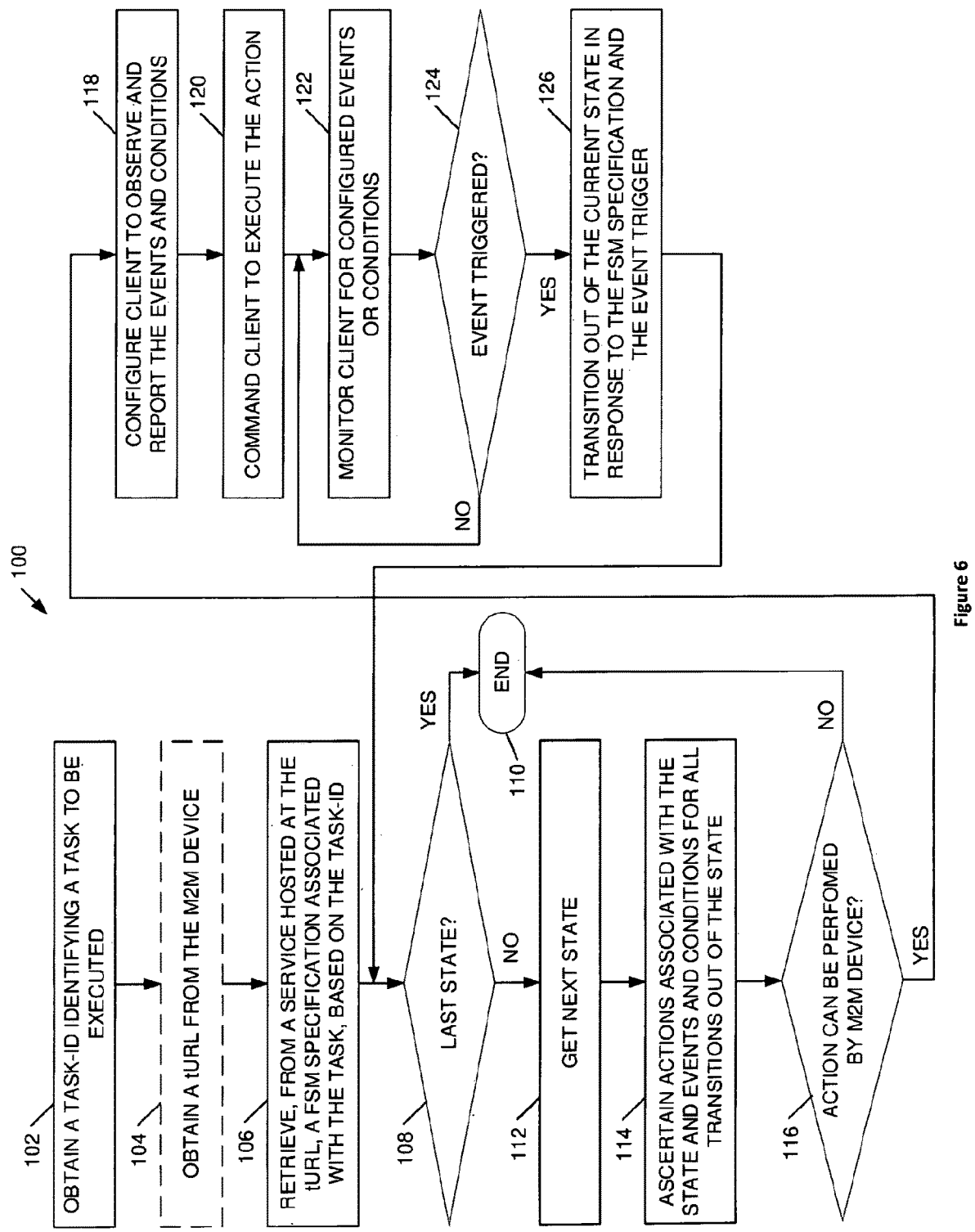
FIG. 6 is a flow diagram of method of a TOM executing a task at least partially on a M2M device.

FIG. 6 depicts a method 100, performed by the TOM 32, of executing a task at least partially on an M2M device 20. A task-ID, identifying a task to be executed, is obtained (block 102), such as from a task management application 12. If not previously done, the TOM 32 obtains a tURL 34 from the M2M device 20 (block 104; note that the tURL 34 may have been obtained earlier, such as when the M2M device 20 registered, and hence this step 104 not performed, which is indicated by dashed lines). The tURL 34 identifies the host 36 of a service 38 associating tasks (in one embodiment, identified by task-ID), with FSM specifications. The TOM 32 retrieves, from the service 38, a FSM specification associated with the task, based on the task-ID (block 106). Successively, for each of a plurality of states in the FSM, the TOM 32 performs the following method steps, until the last state is reached (block 108), at which point the method 100 ends (block 110).

So long as it is not in the last state (block 108), the TOM 32 retrieves the next state according to the state transitions in the FSM specification (block 112). The TOM 32 ascertains one or more actions associated with the current state, and the events and conditions for all transitions out of the current state (block 114). The TOM 32 determines which computing, sensor, or other resources are available and appropriate for performing the action. If at least one action can be performed by the M2M device 20 (block 116), then the TOM 32 configures a device management protocol client 18 (e.g., a Leshan client) to observe and report the events and conditions ascertained in block 114 (block 118). As described above, this may include setting a timeout, and/or setting the values of parameters that control the observations and reporting (e.g., Pmin, Pmax). The TOM 32 then commands the device management protocol client 18 to execute, on the M2M device 20, the action associated with the state (block 120). In one embodiment, this comprises sending a label for the action to the device management protocol client 18, which maps the label to library functions 22 available on the M2M device 20, such as by utilizing a label-library map 40. The device management protocol client 18 then sequences through the mapped library function 22 calls to perform the action.

The TOM 32 monitors the device management protocol client 18 for occurrences of configured events or conditions, as described above (block 122). An event trigger decision block 42 decides when an event is triggered (block 124), in response to the monitoring. If no event is triggered (block 124), the monitoring continues (block 122). When an event is triggered signaling completion (or failure) of the action (block 124), the TOM 32 transitions out of the current state, in response to the FSM specification and the event trigger. If this was the last state (block 108), the method 100 terminates (block 110). Otherwise (block 108), the TOM 32 goes to the next state (block 112), and continues execution of the task, according to the FSM specification.

Figure 7:
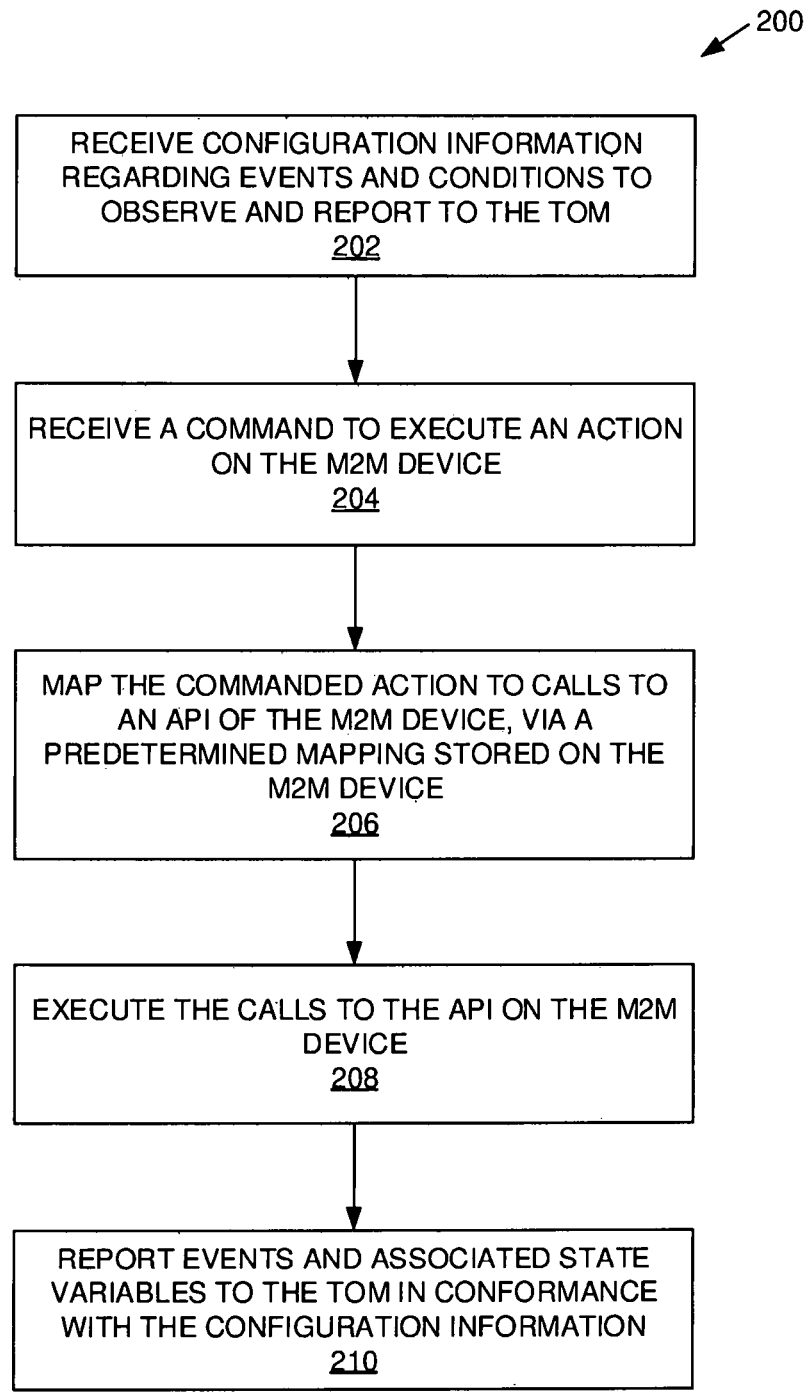
FIG. 7 is a flow diagram of method of a device management protocol client executing at least part of a task on an M2M device.

FIG. 7 depicts a method 200, performed by a device management protocol client 18 executing on a M2M device 20, of executing at least parts of tasks on the M2M device 20 by a remote TOM 32. The device management protocol client 18 receives, from the TOM 32, configuration information regarding events and conditions to observe and report to the TOM 32 (block 202). The device management protocol client 18 also receives, from the TOM 32, a command to execute an action on the M2M device 20 (block 204). The commanded action is mapped to calls to an API 22 of the M2M device, using a predetermined mapping stored on the M2M device 20, such as the label-library map 40 (block 206). The device management protocol client 18 executes the calls to the API 22 on the M2M device 20 (block 208), and reports events and associated state variables to the TOM 32 in conformance with the configuration information (block 210).

Figure 8:
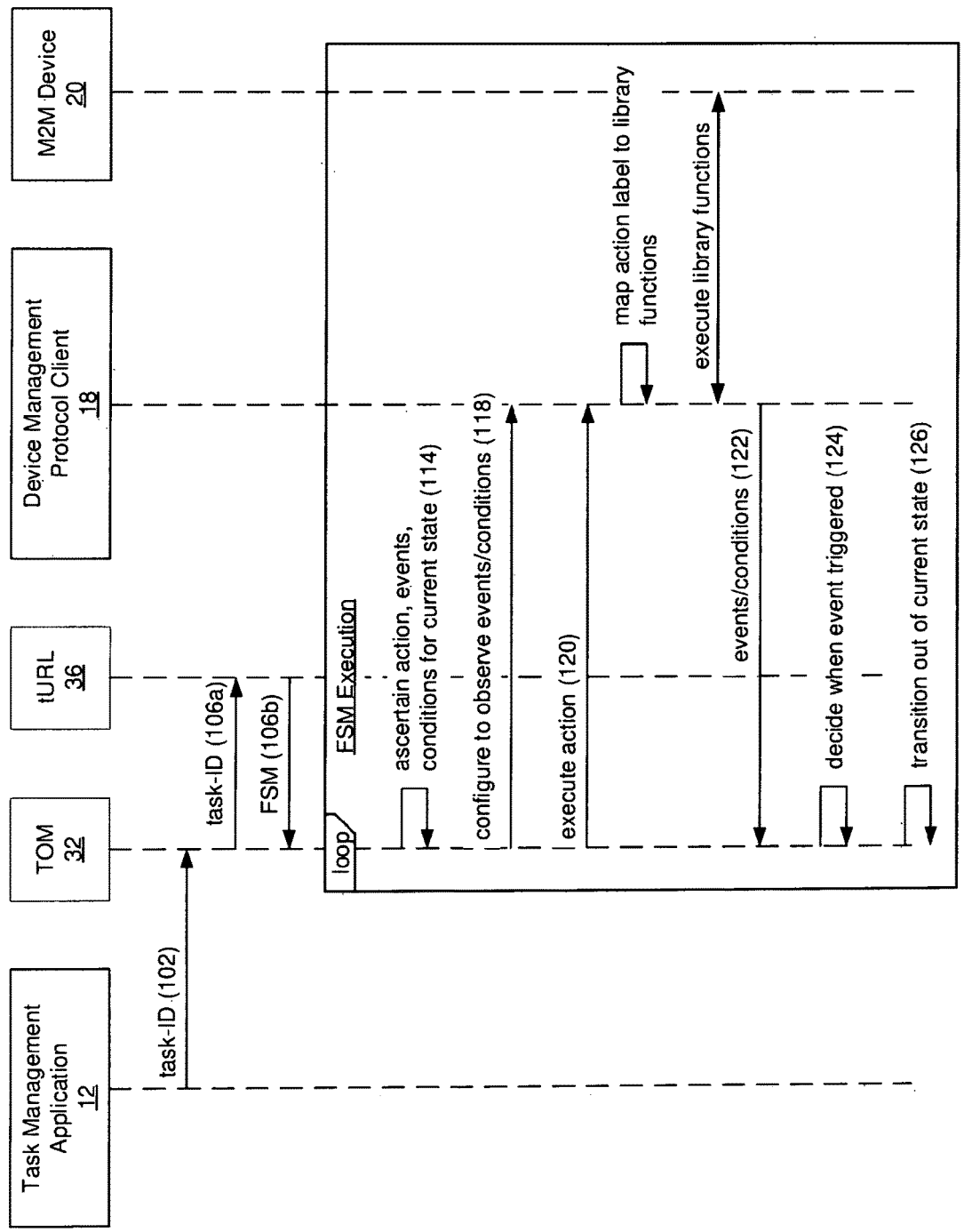
FIG. 8 is a signaling diagram depicting signaling corresponding to the methods of FIGS. 6 and 7.

FIG. 8 is a signaling diagram depicting the major communications between the constituent nodes and entities of the M2M device management system 30, during execution of a task. Where relevant, the signaling is numbered according to the corresponding steps of method 100 (FIG. 6). The TOM 32 obtains a task-ID, identifying a task to be performed, from a task management application 12 (102). The TOM 32 forwards the task-ID to the host 36 identified by the tURL 34 (106a), obtained from the M2M device 20. A service 38 at the tURL host 36 maps the task-ID to a FSM specification, and returns the FSM to the TOM 32 (106b).

To execute the FSM, the TOM 32 successively, for a plurality of states, engages in the following signaling (shown in FIG. 7 as being inside a loop). First, for the current state, the TOM 32 ascertains one or more actions associated with the state, and events and conditions for all transitions out of the state (114). After determining that the M2M device 20 can perform one or more actions, the TOM 32 configures the device management protocol client 18 to observe and report the events and conditions (118). The TOM 32 then commands the device management protocol client 18 to execute, on the M2M device 20, the action associated with the state (120).

The action execution command includes the label of the action to be executed. The device management protocol client 18 maps that label to one or more library functions 22 configured on the M2M device 20, and executes those library functions 22.

The TOM 32 monitors the device management protocol client 18 for any occurrence of configured events or conditions, which the device management protocol client 18 reports (122). Based on the events and conditions reported, the TOM 32 decides when an event is triggered (124). When an event is triggered that is a condition in the FSM specification for exiting the current state, the TOM 32 transitions out of the current state (126). The FSM execution loop may then continue by entering a new state, or it may terminate (either by completion or by timeout or other failure).

Figure 9:
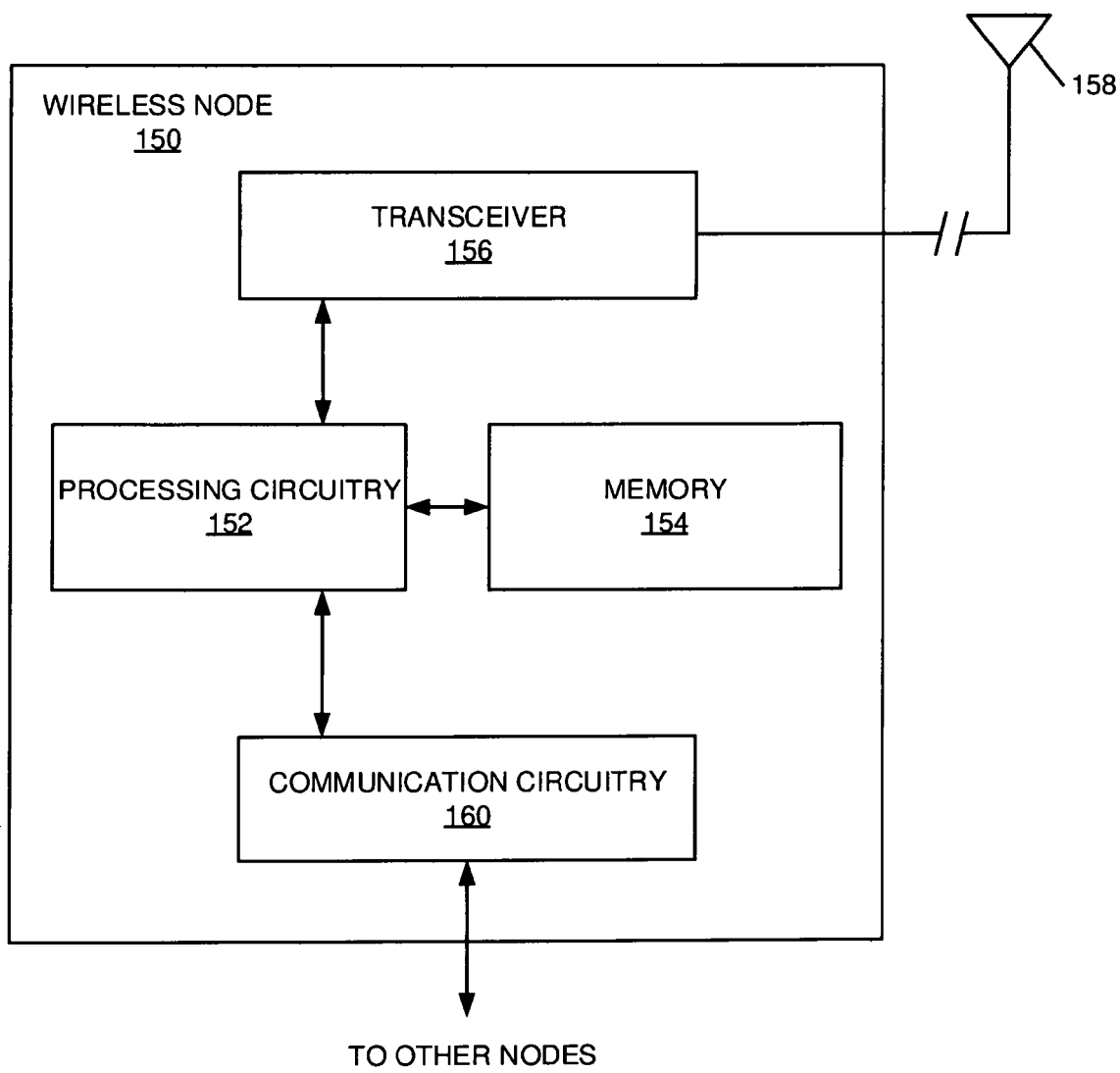
FIG. 9 is a block diagram of a wireless node implementing a TOM.

FIG. 9 is a block diagram of a node 150 operative in a wireless communication network. The wireless node 150 includes processing circuitry 152 operatively connected to memory 154, a transceiver 158, and communication circuitry 160. One or more antennas 158 are operatively connected to the transceiver 156. As indicated by the broken connection to the antenna(s) 158, the antenna(s) may be physically located separately from the wireless node 150, such as mounted on a tower, building, or the like. Although the memory 154 is depicted as being separate from the processing circuitry 152, those of skill in the art understand that the processing circuitry 152 includes internal memory, such as a cache memory or register file. Those of skill in the art additionally understand that virtualization techniques allow some functions nominally executed by the processing circuitry 152 to actually be executed by other hardware, perhaps remotely located (e.g., in the cloud).

According to one embodiment of the present invention, the processing circuitry 152 is operative to cause the wireless node 150 to manage the execution of tasks on one or more M2M devices 20, as described and claimed herein. In particular, the processing circuitry 152 is operative to perform the method 100 described and claimed herein (FIG. 6).

Figure 10:
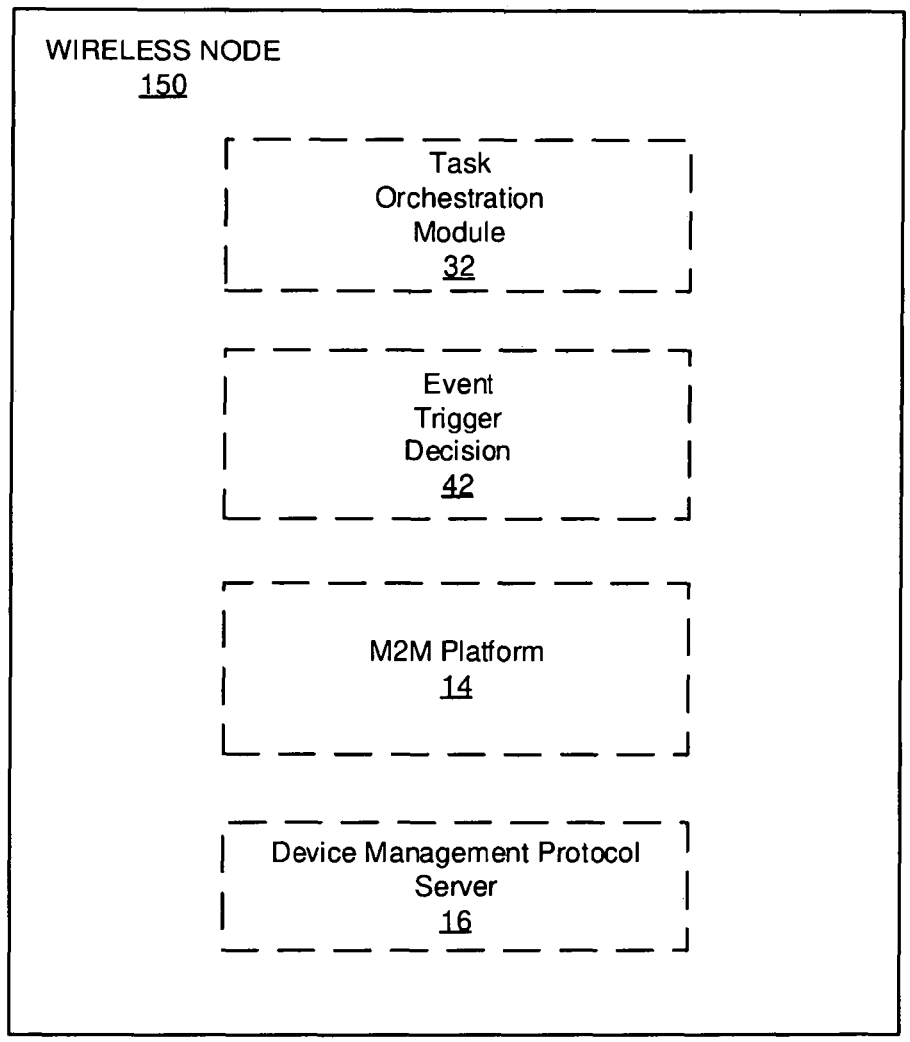
FIG. 10 is a block diagram depicting functional modules on a wireless node.

FIG. 10 depicts a functional view of the wireless node 150, including relevant functional modules implemented thereon. The Task Orchestration Module (TOM) 32, event trigger decision module 42, M2M platform 14, and device management protocol server 16 may be implemented as dedicated hardware or firmware modules, or may be implemented as software modules stored in memory 154 and executed by processing circuitry 152 (or any combination thereof).

Figure 11:
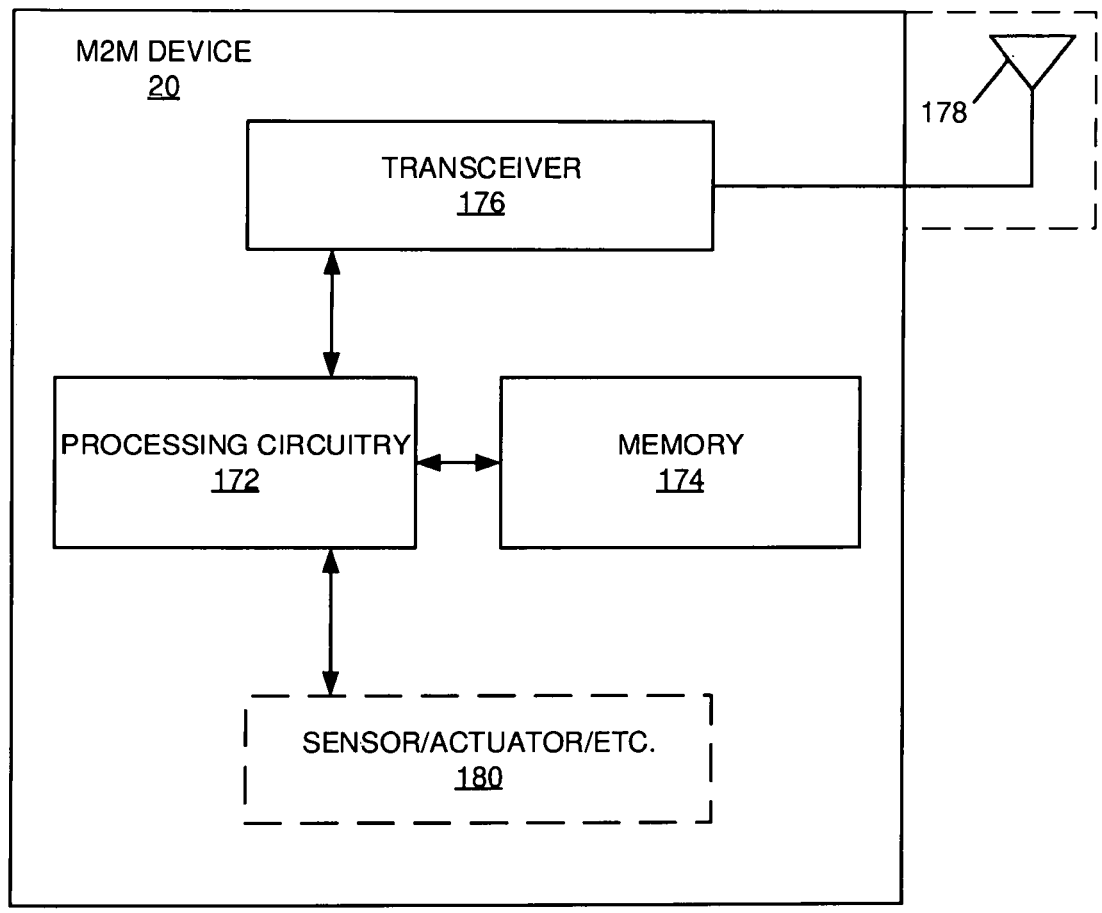
FIG. 11 is a block diagram of a M2M device.

FIG. 11 is a block diagram of an M2M device 20 operative in a wireless communication network. The M2M device 20 includes processing circuitry 172 operatively connected to memory 174, a transceiver 176, and optionally one or more sensors, actuators, or the like 180. One or more antennas 178 are operatively connected to the transceiver 176. As indicated by the dashed-line enclosure, the antennas 178 may be external to the M2M device, or may be internal. Although the memory 174 is depicted as being separate from the processing circuitry 172, those of skill in the art understand that the processing circuitry 172 includes internal memory, such as a cache memory or register file. The sensor, actuator, or the like 180 generally represents special-purpose hardware that may exist on an M2M device 20—that fact that this block may vary widely, or may not be included in all M2M devices 20, is indicated by dashed lines.

Figure 12:
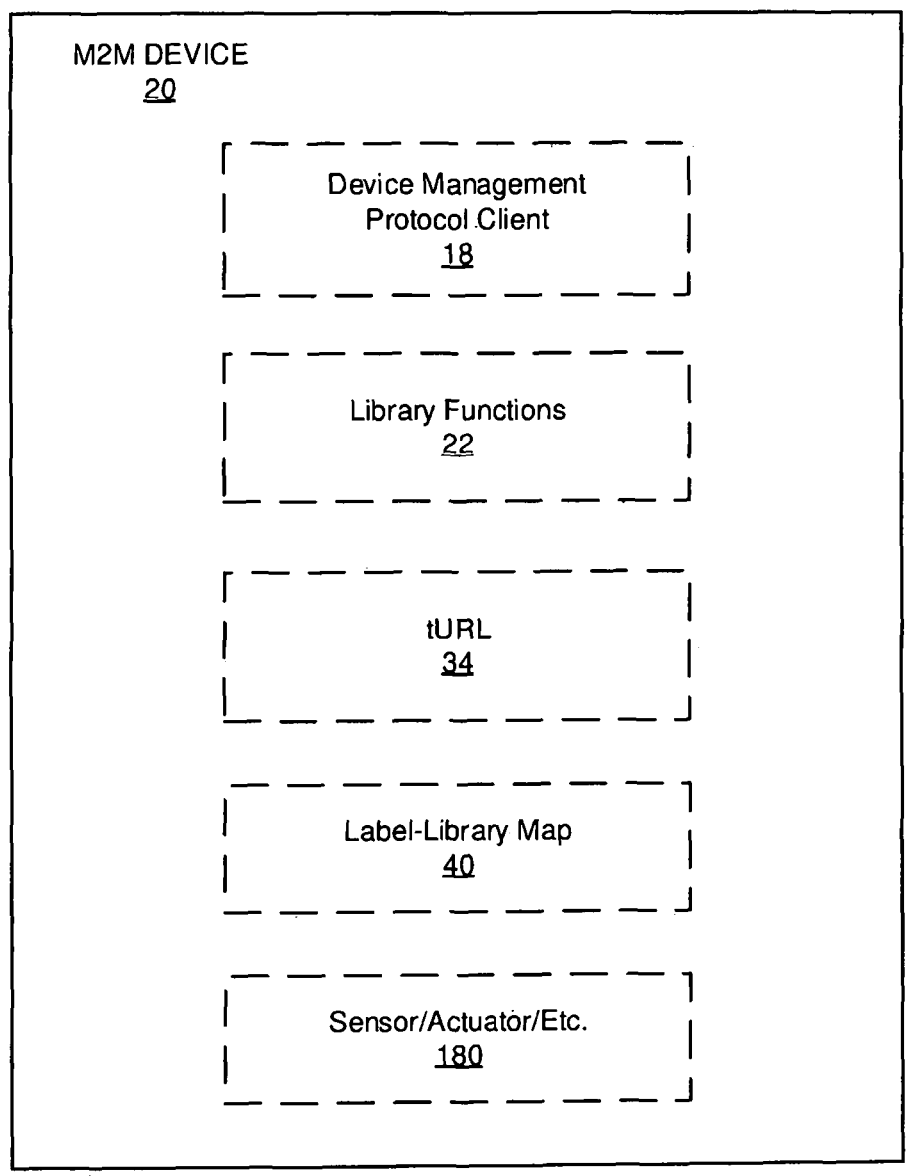
FIG. 12 is a block diagram depicting functional modules on an M2M device.

FIG. 12 depicts a functional view of the M2M device 20, including relevant functional modules implemented thereon. The device management protocol client 18, library functions 22, tURL resource 34, and label-library map 40 may be implemented as dedicated hardware or firmware modules, or may be implemented as software modules stored in memory and executed by processing circuitry on the M2M device 20 (or any combination thereof). The sensors, actuator, or the like 180 may comprise specialized hardware, and concomitant interface circuitry, configuration software, and the like.

In all embodiments, processing circuitry 152, 172 may comprise any sequential state machine operative to execute machine instructions stored as machine-readable computer programs in memory 154, 174 such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

The memory 154, 174 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the transceiver 156, 176 and antenna(s) 158, 178 are operative to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NR, NB-IoT, or the like. The transceiver 156, 176 implements transmitter and receiver functionality appropriate to the RAN links (e.g., frequency allocations and the like). The transmitter and receiver functions may share circuit components and/or software, or alternatively may be implemented separately.

The communication circuitry 160 may comprise a receiver and transmitter interface used to communicate with one or more other network nodes over a communication network according to one or more communication protocols known in the art or that may be developed, such as Ethernet, TCP/IP, SONET, ATM, IMS, SIP, or the like. The communication circuitry 160 implements receiver and transmitter functionality appropriate to the communication network links (e.g., optical, electrical, and the like). The transmitter and receiver functions may share circuit components and/or software, or alternatively may be implemented separately.

Embodiments of the present invention present numerous advantages over the prior art. Because tasks are defined as FSMs, and code for processing the FSM resides in the TOM 32, the M2M device 20 does not store any code to execute tasks (or actions). This conserves both memory and computational resources on the M2M device 20, and hence reduces its power demands, preserving battery life. Because the M2M device includes the tURL resource 34, any TOM 32 (or other management system) can translate tasks relevant to the M2M device 20 into generic FSM specifications for their execution. Because the M2M device includes the label-library map 40, neither the M2M device 20 nor the device management protocol client 18 need to be able to parse or understand the action labels commanded by the TOM 32 to execute actions. Rather, these action labels are mapped to the library functions 22 (e.g., API) provisioned on the M2M device 20 at manufacture. This obviates the need for code resident on the M2M device to not only parse and execute actions, but also monitor and manage their execution (e.g., doing error checks and performing error handling). This further saves memory and compute cycles, and hence further extending battery life. The M2M device management system 30 is also more flexible than prior art systems. As tasks are added and/or task definitions change, the relevant FSM can be updated and tested off-line. The revised FSM is then added to the service 38 at the tURL host 36. If the actions, events, and conditions specified can be implemented using library functions 22 in the M2M device 20, no reflashing or rebooting of the M2M device 20 is required.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, performed by a Task Orchestration Module (TOM) of executing a task at least partially on a machine-to-machine (M2M) device, characterized by:
   obtaining a task-ID identifying a task to be executed;
   retrieving, from a service hosted at a task uniform resource locator (URL) a finite state machine (FSM) specification associated with the task, based on the task-ID; and
   successively for each of a plurality of states in the FSM,
      ascertaining one or more actions associated with the state, and events and conditions for all transitions out of the state;
      determining that at least one action can be performed by the M2M device;
      configuring a device management protocol client to observe and report the events and conditions;
      commanding the device management protocol client to execute, on the M2M device, the action associated with the state;
      monitoring the device management protocol client for occurrence of configured events or conditions;
      deciding when an event is triggered; and
      transitioning out of the current state in response to the FSM specification and the event trigger.

2. The method of claim 1, wherein obtaining a task-ID comprises receiving the task-ID from a management application, and further characterized by, after the last FSM state transition, notifying the management application of the task execution status.

3. The method of claim 1, further characterized by, prior to retrieving the FSM specification, obtaining the tURL from the M2M device, via the device management protocol client.

4. The method of claim 1, wherein commanding the device management protocol client to execute the action comprises sending to the device management protocol client the label for the action from the FSM, whereby the device management protocol client maps the label for the action to an API function on the M2M device using a predetermined mapping.

5. The method of claim 1, wherein, when an event is specified as a timeout, starting a timer and deciding an event is triggered upon expiry of the timer.

6. The method of claim 1, wherein the FSM specifies an event and one or more state variables defining the event and wherein:
  if the number of variables in the event conditions is small and there is a high probability of event trigger with a change in state variables, deciding when an event is triggered comprises configuring the device management protocol client so that any change in the state variable will be notified as a trigger for the event, then evaluating the event definition; and
  if the number of variables in the event conditions is large or there is a low probability of event trigger with a change in state variables, deciding when an event is triggered comprises setting an object in the device management protocol client with the event definitions so that only a final trigger is notified to the TOM.

7. The method of claim 6 wherein whenever an event is triggered, the state variables for the conditions are also notified to the TOM by the device management protocol client.

8. The method of claim 6 wherein the event trigger decision is determined by a machine learning (ML) module employing supervisory learning on the history of the variable values and event triggers.

9. The method of claim 8 wherein the supervisory learning occurs only during a training period, and is repeated only when the event definitions and state variable access methods are re-implemented on the M2M device.

10. A node of a wireless communication network implementing a Task Orchestration Module (TOM) operative to execute a task at least partially on a machine-to-machine (M2M) device, characterized by:
  a transceiver; and
  processing circuitry operatively connected to the transceiver and configured to:
    obtain a task-ID identifying a task to be executed;
    retrieve, from a service hosted at a task uniform resource locator (URL) a finite state machine (FSM) specification associated with the task, based on the task-ID; and
    successively for each of a plurality of states in the FSM,
      ascertain one or more actions associated with the state, and events and conditions for all transitions out of the state;
      determine that at least one action can be performed by the M2M device;
      configure a device management protocol client to observe and report the events and conditions;
      command the device management protocol client to execute, on the M2M device, the action associated with the state;
      monitor the device management protocol client for occurrence of configured events or conditions;
      decide when an event is triggered; and
      transition out of the current state in response to the FSM specification and the event trigger.

11. The node of claim 10, wherein the processing circuitry is configured to obtain a task-ID by receiving the task-ID from a management application, and further characterized by, after the last FSM state transition, notifying the management application of the task execution status.

12. The node of claim 10, wherein the processing circuitry is further configured to, prior to retrieving the FSM specification, obtain the tURL from the M2M device, via the device management protocol client.

13. The node of claim 10, wherein the processing circuitry is configured to command the device management protocol client to execute the action by sending to the device management protocol client the label for the action from the FSM, whereby the device management protocol client maps the label for the action to an API function on the M2M device using a predetermined mapping.

14. The node of claim 10, wherein, when an event is specified as a timeout, the processing circuitry is configured to start a timer and decide an event is triggered upon expiry of the timer.

15. The node of claim 10, wherein the FSM specifies an event and one or more state variable defining the event and wherein:
  if the number of variables in the event conditions is small and there is a high probability of event trigger with a change in state variables, the processing circuitry is configured to decide when an event is triggered by configuring the device management protocol client so that any change in the state variable will be notified as a trigger for the event, then evaluating the event definition; and
  if the number of variables in the event conditions is large or there is a low probability of event trigger with a change in state variables, the processing circuitry is configured to decide when an event is triggered by setting an object in the device management protocol client with the event definitions so that only a final trigger is notified to the TOM.

16. The node of claim 15 wherein whenever an event is triggered, the state variables for the conditions are also notified to the TOM by the device management protocol client.

17. The node of claim 15 wherein the processing circuitry is further configured to decide event triggers by executing a machine learning (ML) module employing supervisory learning on the history of the variable values and event triggers.

18. The node of claim 17 wherein the supervisory learning occurs only during a training period, and is repeated only when the event definitions and state variable access nodes are re-implemented on the M2M device.

19. A non-transitory computer readable medium containing instructions that, when executed by processing circuitry on a node operative in a wireless communication network, are operative to cause the node to implement a Task Orchestration Module (TOM) operative to execute a task at least partially on a machine-to-machine (M2M) device, by performing the steps of:
  obtaining a task-ID identifying a task to be executed;

retrieving, from a service hosted at a task uniform resource locator (tURL) a finite state machine (FSM) specification associated with the task, based on the task-ID; and successively for each of a plurality of states in the FSM,
ascertaining one or more actions associated with the state, and events and conditions for all transitions out of the state;
determining that at least one action can be performed by the M2M device;
configuring a device management protocol client to observe and report the events and conditions;
commanding the device management protocol client to execute, on the M2M device, the action associated with the state;
monitoring the device management protocol client for occurrence of configured events or conditions;
deciding when an event is triggered; and
transitioning out of the current state in response to the FSM specification and the event trigger.

20. A method, performed by a device management protocol client executing on a machine-to-machine (M2M) device, of executing at least parts of tasks on the M2M device by a remote Task Orchestration Module (TOM) characterized by:
receiving, from the TOM, a request for task uniform resource locator (tURL);
retrieving the tURL from the M2M device;
sending the tURL to the TOM; and
subsequent to sending the tURL to the TOM,
receiving, from the TOM, configuration information regarding events and conditions to observe and report to the TOM;
receiving, from the TOM, a command to execute an action on the M2M device;
mapping, via a predetermined mapping stored on the M2M device, the commanded action to calls to an application programming interface (API) of the M2M device;
executing the calls to the API on the M2M device; and
reporting events and associated state variables to the TOM in conformance with the configuration information.

21. The method of claim 20 further characterized by repeating the receive a command, map, execute, and report method steps as necessary as the TOM successively transitions between states of a finite state machine defining the task.

22. A machine-to-machine (M2M) device operative in a wireless communication network and to execute at least parts of tasks under the control of a remote Task Orchestration Module (TOM) characterized by;
a transceiver; and
processing circuitry operatively connected to the transceiver and implementing a device management protocol client configured to:
receive, from the TOM, a request for task uniform resource locator (tURL);
retrieve the tURL from the M2M device;
send the tURL to the TOM; and
subsequent to sending the tURL to the TOM,
receive, from the TOM, configuration information regarding events and conditions to observe and report to the TOM;
receive, from the TOM, a command to execute an action on the M2M device;
map, via a predetermined mapping stored on the M2M device, the commanded action to calls to an application programming interface (API) of the M2M device;
execute the calls to the API on the M2M device; and
report events and associated state variables to the TOM in conformance with the configuration information.

23. The M2M device of claim 22 wherein the device management protocol client is further configured to repeat the steps receive a command, map, execute, and report operations as necessary as the TOM successively transitions between states of a finite state machine defining the task.

24. A non-transitory computer readable medium containing instructions that, when executed by processing circuitry on a machine-to-machine (M2M) device operative in a wireless communication network, are operative to cause the M2M, device to execute at least parts of tasks on the M2M device by a remote Task Orchestration Module (TOM) by performing the steps of:
receiving, from the TOM, a request for task uniform resource locator (tURL);
retrieving the tURL from the M2M device;
sending the tURL to the TOM; and
subsequent to sending the tURL to the TOM,
receiving, from the TOM, configuration information regarding events and conditions to observe and report to the TOM;
receiving, from the TOM, a command to execute an action on the M2M device;
mapping, via a predetermined mapping stored on the M2M device, the commanded action to calls to an application programming interface (API) of the M2M device;
executing the calls to the API on the M2M device; and
reporting events and associated state variables to the TOM in conformance with the configuration information.

* * * * *